Nov. 6, 1962 V. CHANDLER 3,062,625
APPARATUS FOR GAS ANALYSIS
Filed Dec. 19, 1960
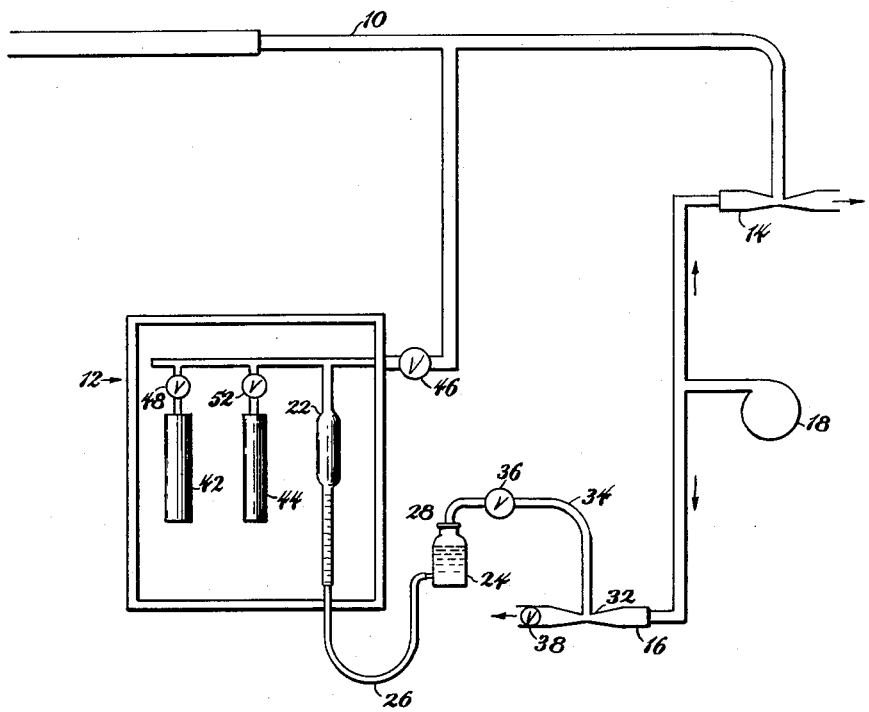
INVENTOR
Victor Chandler
By Wayne Lang
AGENT

United States Patent Office 3,062,625
Patented Nov. 6, 1962

3,062,625
APPARATUS FOR GAS ANALYSIS
Victor Chandler, Wellsville, N.Y., assignor, by mesne assignments, to Combustion Engineering, Inc., a corporation of Delaware
Filed Dec. 19, 1960, Ser. No. 76,578
4 Claims. (Cl. 23—256)

This invention relates to an improved apparatus for the analysis of flue gas and more particularly to apparatus that decreases the time required to make satisfactory analysis of gas with apparatus of the Orsat type.

Orsat type apparatus for the analysis of flue gas has been the accepted standard for many years, and while the basic process involved is simple, it is a generally slow, tedious operation. The basic process involved requires first the measurement of a given amount of flue gas, usually 100 cubic centimeters, into a graduated burette from which it is passed to a pipette containing a solution that absorbs a single predetermined gas, as carbon dioxide, that is contained therein. The flue gas is then returned to the graduated burette where it will occupy a smaller volume because of the removal of the carbon dioxide. The difference between the initial volume and the subsequent volume is a measure of the carbon dioxide. The remaining flue gas is similarly exposed to a second solution that removes carbon monoxide and upon measurement the volume of that gas becomes known. The process may be repeated with other gas absorbing solutions to determine the volume of oxygen and other trace gasses present.

In operating an Orsat apparatus a measuring burette is first fi led at atmospheric pressure with a representative sample of the gas to be analyzed after which the gas supply is isolated from the sample. A leveling bottle is connected by means of a flexible tube to the burette in such a manner that a displacement liquid carried in the leveling bottle may be transferred to the burette to displace the gas therein by selectively raising the leveling bottle and permitting the displacement fluid to seek its own level. By repeated manipulation of the leveling bottle the displacement fluid may be transferred between the leveling bottle and burette in order that the gas sample may be passed to and from the absorption pipettes where the various constituent gasses are absorbed in order that the remaining gas may be measured to determine the relative amounts of constituent gases present.

Transferring a gas sample between the burette and various pipettes by the manual procedure of raising and lowering a leveling bottle is a slow and tedious operation that results in fewer gas analyses over a given period of time than is usually to be desired. Moreover, the operation is tiring to the operator who must repeatedly raise and lower the leveling bottle to properly effect the transfer of the gas sample between the burette and the various pipettes.

This invention is therefore directed to a novel pumping apparatus that rapidly draws a gas sample into the burette and then quickly transfers it between the burette and the various pipettes as required for the absorption process.

The exact manner in which the invention may be carried into effect will be best understood upon consideration of the following specification taken in conjunction with the drawing in which the single figure is a diagrammatic representation of the testing apparatus.

Referring now to the drawing the exhaust gas is drawn from a suitable source of supply through a sampling tube 10 to an Orsat apparatus shown generally at 12. The exhaust gas is drawn from its source of supply by the suction produced in aspirators 14 and 16 when a quantity of compressed air or other fluid from a source 18 is directed therethrough. Aspirator 14 provides sufficient suction to draw the gas sample into the tube 10 while aspirator 16 draws the gas sample from tube 10 into the burette 22 of a standard Orsat apparatus.

The quantity of gas drawn into the burette may be accurately regulated and measured by manipulation of the leveling bottle 24 which is connected to the burette by a flexible hose 26. The opening 28 of the leveling bottle in turn is connected to the suction port 32 of aspirator by a flexible tube 34 in which a shut off valve 36 is positioned.

A cut-off valve 38 is positioned in the outlet duct of aspirator 16 to permit sudden and complete closure of this duct to the passage of pressure fluid therethrough. Closure of this valve effectively changes the normal suction port 32 to a pressure outlet whereby pressure fluid from supply 18 that enters the aspirator is directed through port 32 and tube 34 to the leveling bottle 24 where it forces the displacement fluid to flow into burette 22 and in turn displace the gas sample therein. Conversely, opening valve 38 permits the flow of fluid through the aspirator to induce a suction at port 32 that will be effective through tube 34 to draw the displacement fluid from burette 22 back to the leveling bottle.

Thus after a gas sample has been delivered to the burette 22 a simple manipulation of aspirator valving means 38 will effectively produce a positive or negative pressure in tube 34 that will move the displacement fluid from leveling bottle 24 to burette 22 or from the burette 22 back to the leveling bottle in order that a gas sample in the Orsat apparatus may be quickly and easily transferred between the burette 22 and the pipettes 42 and 44 that comprise such apparatus.

Valving means 46 in the sampling tube leading to Orsat 12 and valves 48 and 52 in the inlets to the absorption pipettes 42 and 44 are adapted to permit isolation of the Orsat apparatus from the gas supply and then selective transfer of a gas sample between the burette 22 and the pipettes 42 and 44.

In operation, the Orsat apparatus is first purged of any residual gas by opening valves 36, 38 and 46 while pressure fluid from source 18 flows through aspirators 14 and 16 and draws a quantity of the gas to be tested through sampling tube 10 to the burette 22, leveling bottle 24, port 32 and aspirator valving means 38 where it is exhausted to the atmosphere. After a suitable purging period the valve 36 is closed to trap a quantity of gas in the burette 22 which will serve as the sample to be tested. By manipulation of the leveling bottle all but a predetermined amount, usually 100 cubic centimeters, of the gas sample may be displaced before valve 46 is closed to completely isolate a measured volume of gas in the burette 22.

After the measured sample of gas is isolated in burette 22 the valve 36 is opened and valve 38 is closed to direct compressed air from supply 18 to exhaust through port 32, line 34 and valve 36 to leveling bottle 24 where the air displaces the displacement fluid into burette 22 to force the gas sample from the burette into the first pipette 44 where the absorbing solution therein removes the carbon dioxide from the gas sample.

After a predetermined interval, the aspirator valve 38 is opened to permit pressure fluid from supply 18 to exhaust therethrough and transform port 32 to a suction connection that draws the displacement fluid from burette 22 back into the leveling bottle. At this point valve 36 is closed to permit of the gas remaining after removal of the carbon dioxide to be measured, thus indicating by difference the volume of the gas absorbed. Valve 52 is then closed while valve 48 is opened to permit the remainder of the gas sample to be exposed to an oxygen absorbing material in pipette 42. The transfer of the gas sample to pipette 42 is accomplished by again closing aspirator valve 38 to direct compressed air from supply 18 through port 32, tubing 34 and valve 36 to the leveling bottle 24. As the air moves the displacement fluid from leveling bottle 24 to burette 22, the gas sample is in turn transferred from burette 22 and open valve 48 to pipette 42 where the oxygen is absorbed. Upon opening aspirator valve 38 the flow of pressure fluid from supply 18 through the aspirator again produces a suction at port 32 that draws the displacement fluid back in to leveling bottle 24. Remeasurement of the gas sample in the burette will again indicate by difference the volume of the gas removed therefrom.

Thus by manipulation of a single valve 38 the displacement fluid carried in leveling bottle 24 is rapidly moved to and from the burette 22 where it displaces the gas sample according to a predetermined procedure.

What I claim is:

1. Gas testing apparatus including a graduated burette adapted to measure a quantity of gas carried thereby; a series of pipettes carrying gas absorbing material; flow lines interconnecting the burette and pipettes including means adapted to preclude flow to an individual pipette; a leveling bottle including a displacement fluid carried thereby; flexible tubing interconnecting the leveling bottle and the burette to permit the flow of displacement fluid therebetween; an aspirator having an inlet and outlet port for compressed air and a suction port therebetween; a passageway interconnecting the suction port of the aspirator with the leveling bottle; and means for valving the outlet port of said aspirator to selectively reverse the flow of air in said passageway to permit moving the displacement fluid from the leveling bottle to the burette and from the burette to the leveling bottle.

2. Gas testing appparatus including a graduated burette adapted to measure a quantity of gas carried thereby; a series of pipettes carrying gas absorbing material; flow lines interconnecting the burette and pipettes including means adapted to preclude fluid flow to any individual pipette; a leveling bottle including a displacement fluid carried thereby; tube means interconnecting the leveling bottle and the burette to permit the flow of displacement fluid therebetween; an aspirator having an inlet and outlet port for pressure fluid with a suction port therebetween; a passageway interconnecting the suction port of the aspirator with the leveling bottle; and valve means in said aspirator adapted to selectively reverse the flow of fluid in the passageway between the suction port and the leveling bottle.

3. Gas testing apparatus including a graduated burette adapted to measure a quantity of gas carried thereby; a series of pipettes carying gas absorbing material; flow lines interconnecting the burette and the pipettes including valve means adapted to preclude fluid flow to any pipette; a leveling bottle including a displacement fluid carried thereby; tube means interconnecting the leveling bottle and the burette adapted to permit the flow of displacement fluid therebetween; a source of fluid under pressure; an aspirator having inlet and outlet ports for said pressure fluid with a suction port therebetween; a passageway interconnecting the suction port of the aspirator with the leveling bottle; and valve means in said aspirator adapted to selectively close the outlet port for said pressure fluid whereby said pressure fluid is directed out of the suction port into the leveling bottle.

4. Gas testing apparatus as defined in claim 3 wherein the valve means of the aspirator is located in its outlet port.

References Cited in the file of this patent

UNITED STATES PATENTS 2,866,691     Feichtinger _____ Dec. 30, 1958

FOREIGN PATENTS 306,095     Germany _____ June 17, 1918
820,119     France _____ July 26, 1937